United States Patent [19]

Terai et al.

[11] Patent Number: 4,956,847
[45] Date of Patent: Sep. 11, 1990

[54] ELECTRODES FOR A GAS LASER APPARATUS AND METHOD OF MAKING THE SAME

[75] Inventors: Kiyohisa Terai; Koichi Nishida, both of Yokohama, Japan

[73] Assignee: Kabushiki Kaisha Toshiba, Kawasaki, Japan

[21] Appl. No.: 356,421

[22] Filed: May 25, 1989

[30] Foreign Application Priority Data

Jun. 10, 1988 [JP] Japan .................. 63-143944

[51] Int. Cl.$^5$ .............................................. H01S 3/077
[52] U.S. Cl. ...................... 372/87; 372/85; 372/55; 372/56
[58] Field of Search .............. 372/74, 85, 87, 88, 372/55, 56, 61

[56] References Cited

U.S. PATENT DOCUMENTS

| 3,962,656 | 6/1976 | Peressini | 372/74 |
| 4,122,411 | 10/1978 | Fein et al. | 372/87 |
| 4,574,380 | 3/1986 | Nan | 372/87 |
| 4,639,926 | 1/1987 | Wang et al. | 372/87 |
| 4,821,280 | 4/1989 | Kawase | 372/88 |
| 4,890,035 | 12/1989 | Prein et al. | 313/633 |

FOREIGN PATENT DOCUMENTS 0270876 6/1988 European Pat. Off. .

OTHER PUBLICATIONS

Iehisa et al., "Performance Character Istics of Sealed-Off $CO_2$ Lawer with $LA_{1-x}Sr_xCoO_3$ Oxide Cathode," Journal of Applied Physics, 59 (1986), Jan., No. 2, Woodbury, New York, USA, pp. 314-323.

Primary Examiner—William L. Sikes
Assistant Examiner—Georgia Y. Epps
Attorney, Agent, or Firm—Foley & Lardner, Schwartz, Jeffery, Schwaab, Mack, Blumenthal & Evans

[57] ABSTRACT

In a gas laser, the surface of either or both of discharge electrodes are formed from titanium oxide which provides fine sputtering proof. The discharge electrodes are formed from titanium as a base material having an oxidized surface. Alternatively, the discharge electrodes are formed from molybdenum as a base material with titanium coated and the surfaces are oxidized. In the gas laser of the direct current discharge type, the cathode is formed as described above. Both of cathode and anode are formed as described above in the gas laser of the alternate current discharge type.

8 Claims, 4 Drawing Sheets

ELECTRODES FOR A GAS LASER APPARATUS AND METHOD OF MAKING THE SAME

BACKGROUND OF THE INVENTION

The present invention relates to a gas laser apparatus of the type wherein a pair of discharge electrodes are disposed so as to be placed in an atmosphere of a gas mixture as a laser medium, and more particularly to an improvement of a material of the discharge electrodes of the gas laser apparatus.

As the gas laser of the above-mentioned type, a $CO_2$ laser has been used for material processing. The $CO_2$ laser generally comprises a discharge section filled with a gas mixture as a laser medium, a plurality of anode bars provided in the discharge section so as to be arranged in the shape of a reed screen, and a plurality of generally L-shaped cathode bars disposed in opposite relation to the anode bars. A high voltage DC power supply is connected between the discharge electrodes through ballast resistances. DC voltage is applied across the discharge electrodes, causing a glow discharge to take place between the electrodes and thereby exciting the gas mixture. The gas mixture is recirculated through a heat exchanger from the cathode side to the anode side for the purpose of preventing the temperature thereof from being increased. Molybdenum has been conventionally employed as a material of both of the discharge electrodes because of its high melting point.

In the laser apparatus introduced to a production line of a works for the purpose of the material processing not studying, it is desirable that the maintenance cycle of the laser apparatus be as long as possible since the maintenance cycle affects productivity of the production line. While, in the conventional $CO_2$ laser, the discharge electrodes are deteriorated and the electric discharge in the discharge section of the laser is altered from the glow to arc discharge when the maintenance of the electrodes is not executed. Under these circumstances, the maintenance of the discharge electrodes is reiteratively executed in a relatively short cycle. For example, the conventional transverse flow 5-kW gas laser is continuously used for about 200 hours at the maximum.

The inventors of the present invention made experiments to investigate the mechanism of deteriorating the discharge electrodes. From the experiments, the inventors have found that a physical sputtering action is applied to the cathode formed from molybdenum owing to collision of positive ions during the glow discharge. Further, since molybdenum has a sublimation temperature as low as below 700° C., molybdenum is also likely to suffer from the chemical sputtering action. Consequently, the discharge electrodes are deteriorated owing to both physical and chemical sputtering actions. Inspection of the molybdenum cathode after a long time of use shows that net-shaped projections are formed along grain boundaries on the surface of the molybdenum cathode, which makes it clear that the sputtering acts on the cathode ununiformly. Further, a thin oxidized film is formed on the surface of the cathode. It is considered that the thin oxidized film results from an extremely small amount of oxygen contained in the gas mixture in which He, $N_2$, and $CO_2$ are in the ratios of 50:45:5. It is further considered that the oxygen results from leakage through sealing members of an airtight vessel of the gas laser apparatus or decomposition of $CO_2$ contained in the gas mixture.

On the other hand, inspection of the molybdenum anode after a long time of use shows that a piled or stacked substance about 1 or 2 $\mu m$ thick is found on the side thereof confronting the cathode and that black projections, the outer diameter of each of which is about 100 $\mu m$ long are found on the surface thereof. Since the piled substance is amorphous $MoO_3$ and partial to the side of the anode confronting the cathode, it is considered that the above-described sputtering in the cathode causes cathode material particles to scatter and move to the anode with a flow of the gas mixture, resulting in the substance piled up on the anode. Analysis shows that projections formed on the piled substance is composed of carbon. Consequently, it is considered that micro-arcs are generated from the projections.

From the above-described results of analysis, mechanism leading from the deterioration of the discharge electrodes to the generation of micro-arcs is considered as follows: the molybdenum cathode suffers from the sputtering action owing to the glow discharge in the discharge section of the gas laser, resulting in the substance ununiformly piled up on the anode. Since the piled substance is a molybdenum oxide, it has an insulating property. Concentration of the electric field takes place on some portions of the anode surface. While, the net-shaped projections are formed on the surface of the cathode owing to the ununiform sputtering action, which projections also cause concentration of the electric field. The micro-arcs are generated as the result of the electric field concentration and the electric field tends to be concentrated on the micro-arc generating points as the number of the micro-arc generating points is increased, whereby ununiformity of the discharge input progresses. The discharge input locally reaches the arc limit or above and at last, the glow discharge is altered to the arc discharge throughout the discharge section. The above-described condition is applied not only to the gas lasers of the DC discharge type but to those of the AC discharge type, wherein both of the discharge electrodes alternately suffer from the sputtering to thereby be worn and deteriorated.

So far as described, the conventional gas laser has a problem that the oxide produced owing to the sputtering at one discharge electrode side is piled up on the surface of the other discharge electrode and that deterioration of the electrode lowers the arc limit, thereby requiring the maintenance in a short period.

SUMMARY OF THE INVENTION

Therefore, an object of the present invention is to provide a gas laser apparatus wherein the discharge electrodes can be prevented from being deteriorated such that the maintenance cycle thereof is improved.

The gas laser apparatus of the present invention is characterized in that the surface of one or both discharge electrodes are formed from titanium oxide instead of conventionally used molybdenum.

Since titanium oxide is an exceedingly stable material, it has a small sputtering rate and is not likely to suffer from the physical sputtering. Furthermore, since the vapor pressure is relatively low when the atmospheric temperature is high, titanium oxide is not likely to suffer from the chemical sputtering. The vapor pressure takes the value of $10^{-6}$ torr when the temperature of $TiO_2$ is approximately 1530° C., while the temperature of $MoO_3$ is increased only to 490° C. under the same vapor pressure conditions. Consequently, the piled substance resulting from the sputtering at one discharge electrode may be prevented from occurring on the other discharge electrode, thereby preventing the electric field concentration. Furthermore, the state of the surface of titanium is stable, which further prevents the electric field concentration and therefore, occurrence of microarcs. Thus, since the discharge electrodes may be prevented from being deteriorated, a stable discharge may be ensured for a long period.

The discharge electrodes having the surfaces of titanium oxide may be obtained in the following methods. In a first method, the discharge electrodes are formed from titanium as a base material. Prior to incorporation of the discharge electrodes into the gas laser apparatus, the electrodes are baked in the atmosphere so that the surfaces thereof are oxidized. In a second method, the discharge electrodes are formed from titanium as a base material and incorporated in the gas laser apparatus. When the electric discharge is initiated between the discharge electrodes in the usual manner, heat owing to the discharge is applied to the base material of titanium and an extremely small amount of oxygen contained in the gas mixture as the laser medium causes the base material to be oxidized, thereby obtaining the surface of titanium oxide. In a third method, the discharge electrodes are formed from molybdenum as a base material. Titanium is then affixed to the surfaces of the electrodes by way of sputtering, ion plating or laser cladding. Then, the electrodes are previously baked or incorporated in the gas laser apparatus so that the electric discharge is initiated, whereby the surfaces of the electrodes are oxidized. In the case of the gas laser apparatus of the DC discharge type, either one of a pair of discharge electrodes may have the surface of titanium oxide. However, in the case of the gas laser apparatus of the AC discharge type, both of the discharge electrodes need to have the titanium oxide surfaces, respectively.

Other and further objects of this invention will become obvious upon an understanding of the illustrative embodiments to be described or will be indicated in the appended claims, and various advantages not referred to herein will occur to one skilled in the art upon employment of the invention in practice.

DESCRIPTION OF THE PREFERRED EMBODIMENTS

A first embodiment wherein the gas laser apparatus of the present invention is applied to a $CO_2$ laser for material processing will now be described with reference to FIGS. 1 to 4 of the accompanying drawings.

Figure 3:
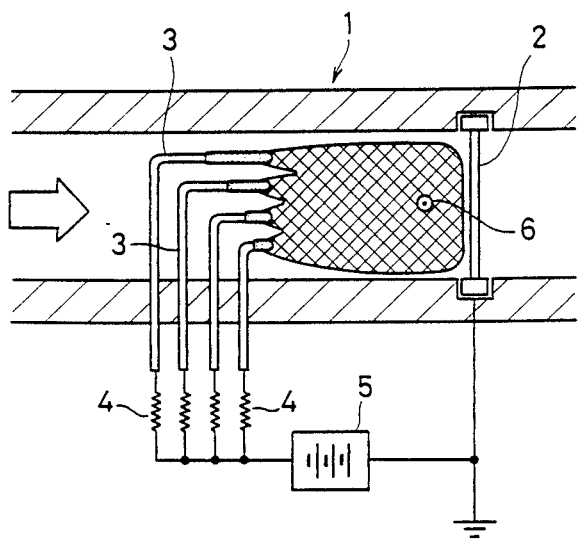
FIG. 3 is a cross sectional view of the discharge section of the gas laser apparatus.

Referring first to FIG. 3, a gas mixture as a laser medium is caused to flow from the left-hand side to the right-hand side of an inner cavity of a discharge section 1, as viewed in FIG. 3. The gas mixture is cooled by a heat exchanger (not shown) and recirculated through the cavity of the discharge section 1. He, $N_2$ and $CO_2$ composing the gas mixture are in the ratios of 50:45:5. It is understood that an extremely small amount of oxygen or the like is contained in the gas mixture. The pressure of the gas mixture is about 30 torr and the flow rate thereof in the discharge section is about 70 m/sec. in the center of the cavity.

Each anode bar 2 of discharge electrodes comprises a slender bar electrode extending vertically. A plurality of such anode bars 2 are aligned across the cavity of the discharge section 1. Each cathode bar 3 of the discharge electrodes comprises a generally L-shaped slender bar electrode. A plurality of such cathode bars 3 are disposed so that ends thereof are directed to the anode bars 2. A DC power supply 5 is connected between the electrodes 2 and 3 through ballast resistances 4 each having the resistance of 20 KΩ so that high DC voltage is applied across the electrodes 2 and 3. When the DC voltage is applied across the electrodes 2 and 3 with the gas mixture being flown through the cavity of the discharge section 1, a glow discharge is initiated. An area in which a glow exists is shown by crossed oblique lines in FIG. 3. A lightening portion of each cathode bar 3 which is covered with the glow is subject to an influence of the gas pressure or the like. In the embodiment, the lightening portion of each cathode bar 3 is in the range between 10 mm and 20 mm from the distal end of each cathode bar 3. Upon occurrence of the glow discharge, $CO_2$ in the gas mixture as the laser medium is excited and laser oscillation takes place between conventional resonators each provided with a reflector (not shown). A beam axle is designated by reference numeral 6 in FIG. 3.

Figure 1:
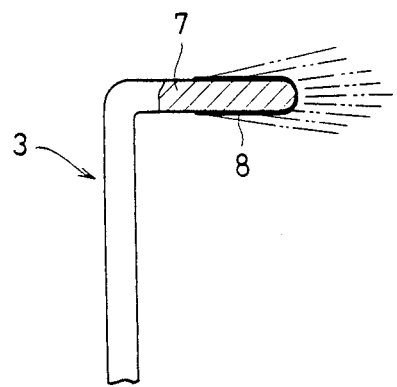
FIG. 1 is a partially cross sectional view of a cathode employed in the gas laser apparatus of a first embodiment in accordance with the invention.
Figure 2:
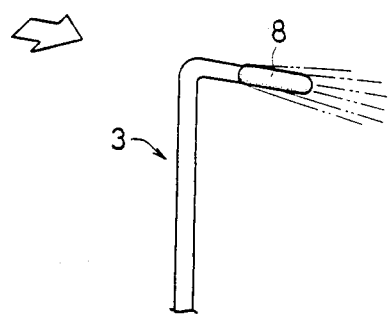
FIG. 2 is a perspective view of the cathode.
Figure 4:
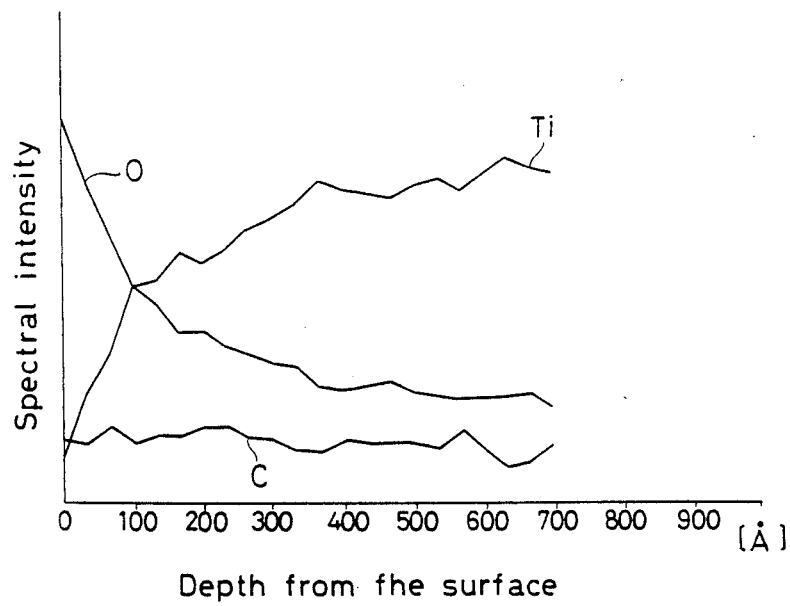
FIG. 4 is a graph representing the result of elemental analysis in the direction of the depth of the cathode before the discharge is initiated.
Figure 5:
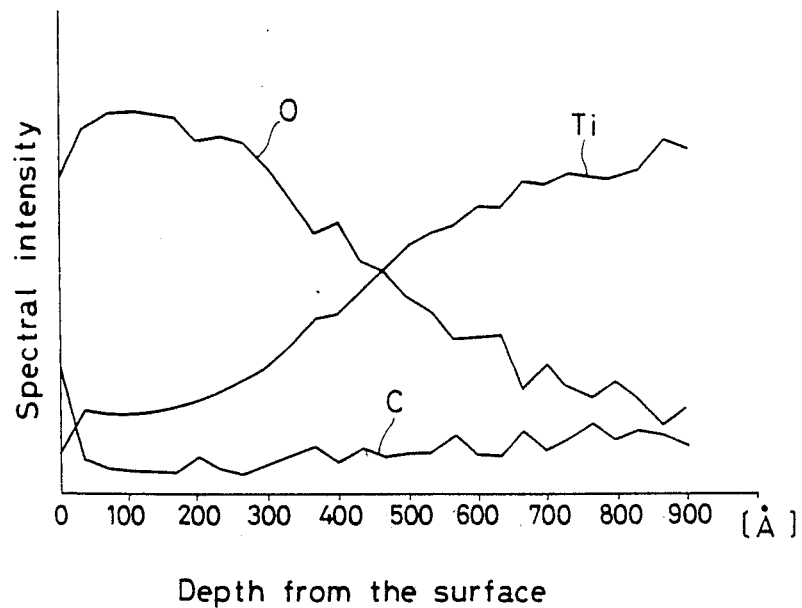
FIG. 5 is a graph representing the result of elemental analysis in the direction of the depth of the cathode at the time when 200 hours elapses from the initiation of discharge.

Titanium is employed as the base material 7 of each cathode bar 3 and a thin titanium oxide film 8 is formed on the surface of the lightening portion, as is schematically shown in FIG. 1. Each cathode bar 3 provided with the titanium oxide film 8 is manufactured as follows: the whole cathode bars 3 are first formed from titanium and incorporated in the discharge section 1 of the gas laser apparatus. The electric discharge is then initiated between the discharge electrodes 2 and 3 in the same manner as in the normal usage of the apparatus. The cathode bars 3 are heated by the glow and the surface of each cathode bar 3 is oxidized owing to an extremely small amount of oxygen contained in the gas mixture, thereby forming a thin titanium oxide film on the surface of each cathode bar 3. For reference, FIGS. 4 and 5 show the results of an elemental analysis of the cathode in the direction of its depth before occurrence of the electric discharge and after the discharge for 200 hours, in accordance with an analysis method based on the Auger effect, respectively. The transverse axis represents the depth from the surface of the cathode and the vertical axis the elemental ratio based on the spectral intensity, in each graph. The graphs show that a thin titanium oxide film of about 500 Å thick is formed on the surface of the cathode formed from titanium as the base material after the electric discharge for 200 hours. The thickness of the titanium oxide film thus formed is nearly proportional to the discharging period.

According to the above-described construction, since the lightening portion surface of each cathode bar 3 is covered with the thin titanium oxide film 8 the sputtering rate of which is considerably low, the physical sputtering is almost prevented even when the electric discharge causes the cathode bars 3 to suffer from the sputtering action. Further, since titanium oxide is a stable material and has a low vapor pressure in the atmosphere of a high temperature, the chemical sputtering is also prevented. Accordingly, an amount of the substance piled on the anode bar 2 is considerably reduced as compared with the case of the conventional cathode formed from molybdenum, whereby concentration of the electric field on the surface of the anode and hence, occurrence of micro-arcs is prevented. Further, since the titanium oxide film 8 is stable, the electric field concentration on the surface of each cathode bar 3 due to ununiform sputtering as seen in the case of the conventional molybdenum cathode is prevented, thereby further restraining the occurrence of micro-arcs.

Figure 6:
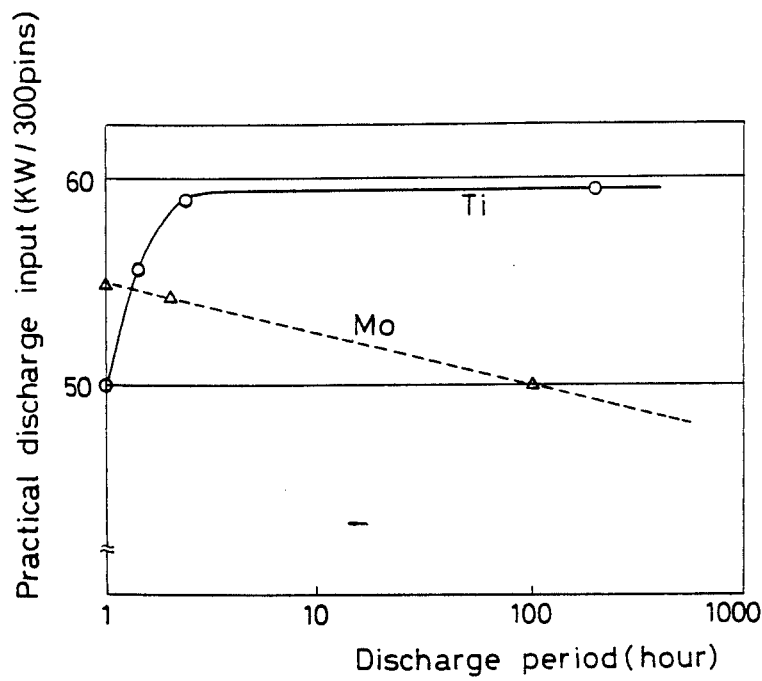
FIG. 6 is a graph representing the relationship between practical discharge input and discharge period.

As the result of the above-described construction, the electrodes 2 and 3 may be prevented from being deteriorated and therefore, a stable discharge may be maintained for a long period. Further, the maintenance cycle of the gas laser apparatus may be improved and the productivity of a production line where the gas laser apparatus is employed may be improved. FIG. 6 shows the relationship between the practical discharge input and discharging period in the case of a transverse flow 5-kW $CO_2$ laser. As shown in FIG. 6, the practical discharge input is gradually reduced in the conventional molybdenum cathode and the electric discharge is maintained only for about 100 hours. While, in the titanium cathode of the present invention, the practical discharge input may be maintained at a large value even after the discharge for 200 hours. The transverse axis in FIG. 6 denotes a logarithmic scale.

The diameter of the titanium cathode is reduced by about 9 μm after the electric discharge for 200 hours. Based on the result, the operational period of the titanium cathode employed in the embodiment is about 10,000 hours. Conventionally, the substance piled on the cathode is required to be removed at an interval of about 200 hours at the longest. While, in the apparatus of the present invention, the interval may be lengthened to about 1,500 hours 7.5 times as long as in the conventional apparatus. As understood from FIG. 6, the titanium cathode 3 shows a tendency that the practical discharge input is low at an initial stage of the electric discharge and increased as the discharge progresses. However, when the baking is executed for the cathode 3 for a longer period than in the conventional apparatus in the test operation of the apparatus at the time of forwarding or shipment from a works, the practical discharge input may be initially maintained at a sufficiently large value.

Figure 7:
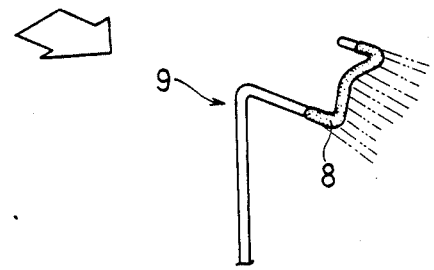
FIG. 7 is a perspective view of a discharge electrode employed in the gas laser apparatus of a second embodiment.

Although the invention is applied to a biaxial cross flow $CO_2$ laser employing the direct-current discharge in the foregoing embodiment, the invention may be applied to other laser apparatus of the type that the discharge electrodes are placed in the atmosphere of the gas mixture as the laser medium without regard to the kind of the gas mixture, for example, axial flow gas lasers, triaxial cross flow gas lasers or the like. Additionally, configurations of the discharge electrodes may not be taken into consideration. For example, the discharge cathode may be formed into a generally Σ-shape as a cathode 9 shown in FIG. 7 as a second embodiment of the invention.

Figure 8:
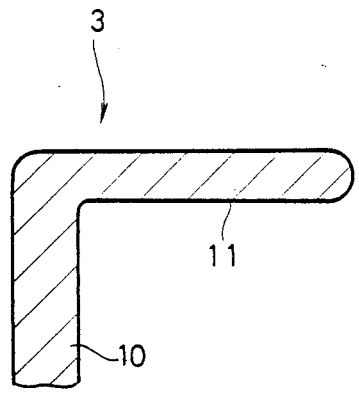
FIG. 8 is a partially cross sectional view of a cathode employed in the pulsed laser apparatus of a third embodiment.

As is shown in FIG. 8 illustrating a third embodiment, each cathode bar 3 may be formed from molybdenum as a base material 10. A titanium coating 11 may be applied to each cathode bar 3 and then oxidized so that titanium oxide film is formed on the surface of each cathode bar 3. The method of applying the titanium coating 11 to each cathode bar 3 includes sputtering, ion plating and laser cladding as well known in the art. Of these methods, the laser cladding is considered to be the best method since it provides for the maximum coating thickness of about 0.4 mm. Further, in order to oxidize the titanium coating 11, the same method as employed in the foregoing embodiment may be applied. Alternatively, the cathode may be heated before the assembling of the laser apparatus so that the titanium coating is oxidized.

Although the invention is applied to the direct current discharge type gas laser in the foregoing embodiment, the invention may be applied to an alternate current discharge type gas laser. Since both of the electrodes alternately suffer from the sputtering action in the gas laser of the alternate current discharge type, both of the cathode and anode need to have the titanium oxide surface. Since construction of a cathode and anode having the titanium oxide surface may be easily understood from the description of the first embodiment with reference to FIGS. 1 to 4, detailed description and drawings for the construction are not provided here.

Furthermore, in order to achieve the object of the invention, the discharge electrodes may be formed from titanium as a base material or from molybdenum as a base material with titanium coated thereon instead of previously forming titanium oxide on the surface of the discharge electrodes as described above. When use of the gas laser apparatus is initiated, the electric discharge induced between the discharge electrodes causes the titanium surface thereof to be oxidized and accordingly, the surface of each electrode is covered with titanium oxide at last. Since this construction is also understood from the description of the first embodiment, detailed description and drawings are not provided.

Figure 9:
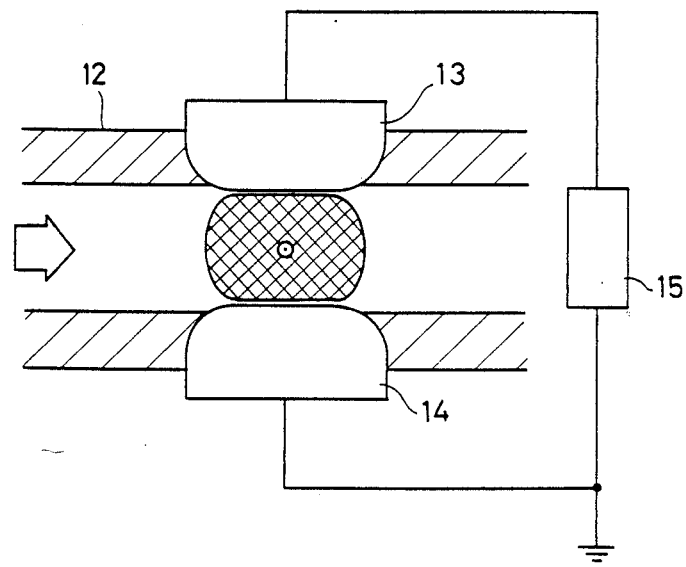
FIG. 9 is a cross sectional view of the discharge section of the pulsed laser apparatus.

FIGS. 8 and 9 show a fourth embodiment wherein the invention is applied to a pulsed laser employing a pulse output. Cathode bars 13 and anode bars 14, both formed from titanium as a base material, are oppositely disposed at the upper and lower sides of the discharge section 12. A pulsed power supply is connected across the electrodes. The titanium oxide film is formed on the surface of the lightening portion of each electrode as the result of oxidization of titanium as the base material. The gas mixture as the laser medium may flow in either the right-hand or left-hand directions, as viewed in FIG. 9. The same effect may be achieved in the fourth embodiment as achieved in the first embodiment.

The foregoing disclosure and drawings are merely illustrative of the principles of the present invention and are not to be interpreted in a limiting sense. The only limitation is to be determined from the scope of the appended claims.

What we claim is:

1. A gas laser apparatus comprising:
   an anode and cathode disposed in an atmosphere of a gas mixture as a laser medium, said cathode having a titanium base;
   means for applying DC voltage across said anode and cathode so that an electric discharge is initiated, thereby exciting said gas mixture;
   a lightening portion on said cathode having a titanium oxide layer on a surface thereof, said lightening portion corresponding to a portion covered with a glow during said electric discharge.

2. A gas laser apparatus comprising:
   an anode and cathode disposed in an atmosphere of a gas mixture as a laser medium, said cathode having a molybdenum base;
   means for applying DC voltage across said anode and cathode so that an electric discharge is initiated, thereby exciting said gas mixture;
   a titanium coating provided on said cathode; and
   a lightening portion on said cathode having a titanium oxide layer on a surface thereof, said lightening portion corresponding to a portion covered with a glow during said electric discharge.

3. A gas laser apparatus comprising:
   a pair of discharge electrodes disposed in an atmosphere of a gas mixture as a laser medium, both of said discharge electrodes having a titanium base,
   means for applying AC voltage across said discharge electrodes so that an electric discharge is initiated, thereby exciting said gas mixture, and
   lightening portions on both of said discharge electrodes having titanium oxide layers on surfaces thereof, respectively, each lightening portion corresponding to a portion covered with a glow during said electric discharge.

4. A gas laser apparatus comprising:
   a pair of discharge electrodes disposed in an atmosphere of a gas mixture as a laser medium, both of said discharge electrodes having a molybdenum base and a titanium coating,
   means for applying AC voltage across said discharge electrodes so that an electric discharge is initiated, thereby exciting said gas mixture, and
   lightening portions on said discharge electrodes having titanium oxide layers on surfaces thereof, respectively, each of said lightening portions corresponding to a portion covered with a glow during said electric discharge.

5. A method of making a cathode for a gas laser apparatus wherein a pair of discharge electrodes are disposed in an atmosphere of a gas mixture as a laser medium and DC voltage is applied across said discharge electrodes so that an electric discharge is initiated, thereby exciting said gas mixture, said method comprising the steps of:
   (a) forming a base cathode from titanium; and
   (b) mounting said base cathode in said gas laser apparatus and oxidizing a surface of said base cathode during said electric discharge initiated between said base cathode and an anode to form a titanium oxide layer on said base cathode.

6. A method of making a cathode for a gas laser apparatus wherein a pair of discharge electrodes are disposed in an atmosphere of a gas mixture as a laser medium and DC voltage is applied across said discharge electrodes so that an electric discharge is initiated, thereby exciting said gas mixture, said method comprising the steps of:
   (a) forming a base cathode from molybdenum as a base material;
   (b) applying a titanium coating to said base cathode; and
   (c) mounting said base cathode in said gas laser apparatus and oxidizing said titanium coating during electric discharge between said base cathode and an anode.

7. A method of making discharge electrodes for a gas laser wherein a pair of discharge electrodes are disposed in an atmosphere of a gas mixture as a laser medium and AC voltage is applied across said discharge electrodes so that an electric discharge is initiated, thereby exciting said gas mixture, said method comprising the steps of;
   (a) forming said discharge electrodes from titanium; and
   (b) mounting said discharge electrodes in said gas laser apparatus and oxidizing surfaces of said discharge electrodes during electric discharge between said discharge electrodes.

8. A method of making discharge electrodes for a gas laser apparatus wherein a pair of discharge electrodes are disposed in an atmosphere of a gas mixture as a laser medium and AC voltage is applied across said discharge electrodes so that an electric discharge is initiated, thereby exciting said gas mixture, said method comprising the steps of:
   (a) forming said discharge electrodes from molybdenum as a base material;
   (b) applying a titanium coating to each of said discharge electrodes; and
   (c) oxidizing said titanium coatings applied to each of said discharge electrodes during electric discharge between said discharge electrodes.

* * * * *